Oct. 20, 1925.
L. A. BALDWIN
1,558,217
INSULATION FOR OIL TANKS
Filed June 1, 1923     3 Sheets-Sheet 3
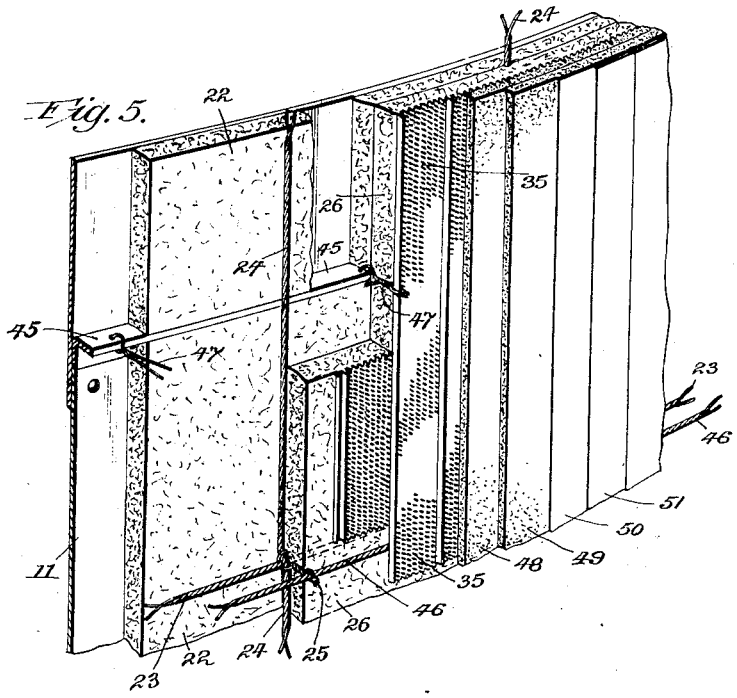

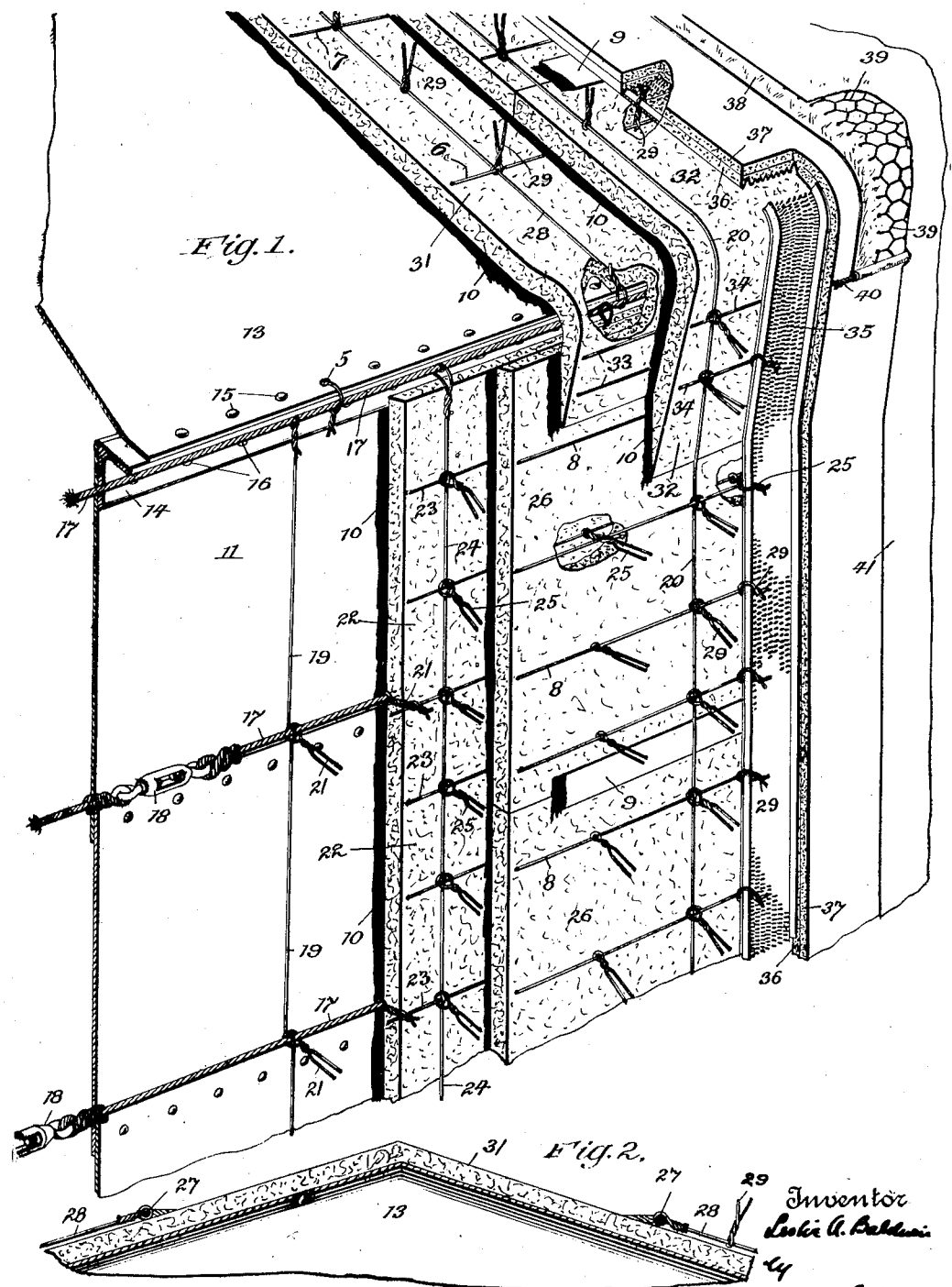

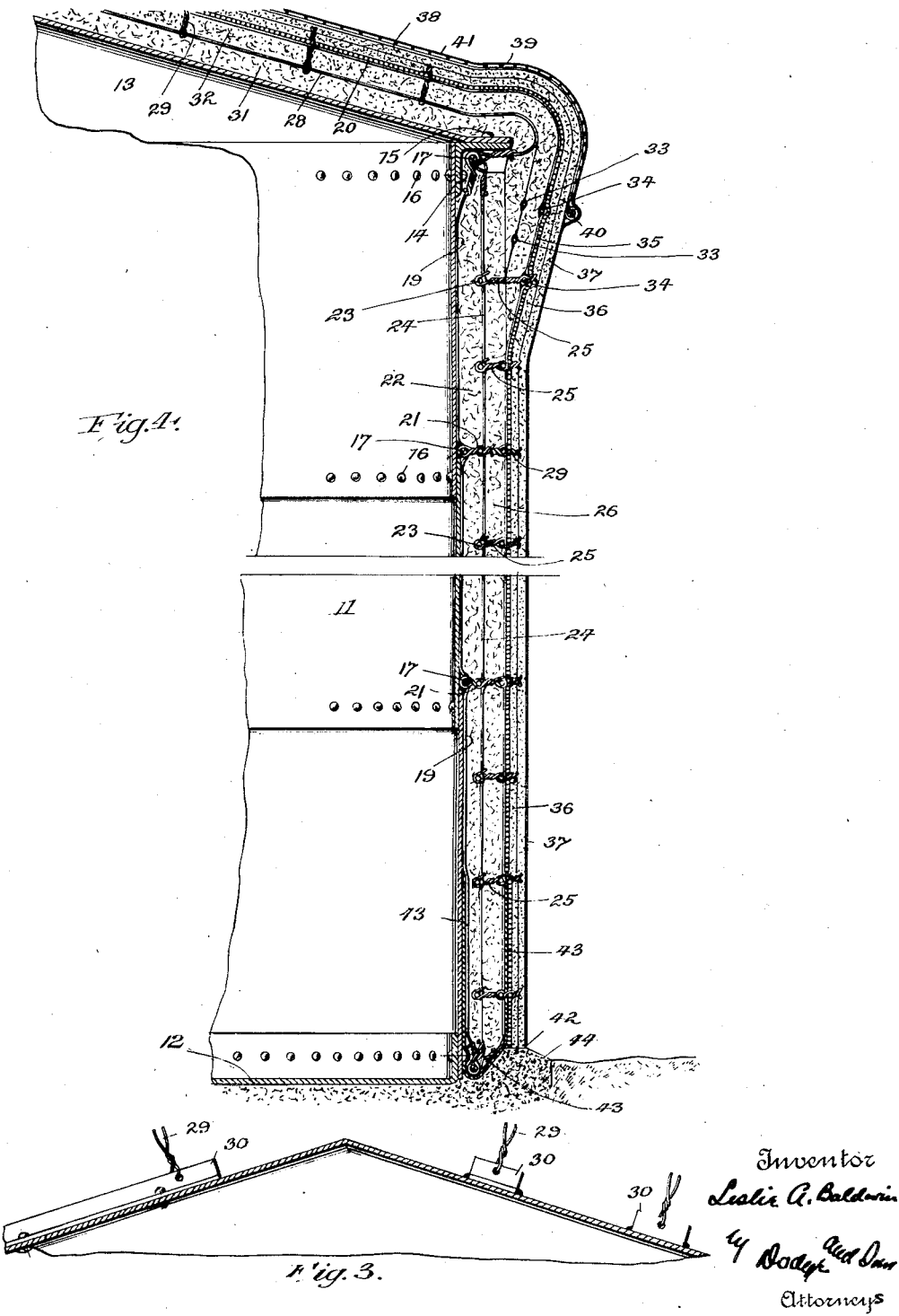

Patented Oct. 20, 1925.

1,558,217

UNITED STATES PATENT OFFICE.

LESLIE A. BALDWIN, OF ST. LOUIS, MISSOURI, ASSIGNOR TO JOHNS-MANVILLE, INC., A CORPORATION OF NEW YORK.

INSULATION FOR OIL TANKS.

Application filed June 1, 1923. Serial No. 642,843.

*To all whom it may concern:*

Be it known that I, LESLIE A. BALDWIN, a citizen of the United States, residing at St. Louis, in the State of Missouri, have invented certain new and useful Improvements in Insulation for Oil Tanks, of which the following is a specification.

This invention relates to storage and like tanks for crude oil, petroleum fractions and the like, and particularly to an insulated tank designed to minimize the evaporation of the lighter and more valuable fractions which are lost in large quantities under present methods of storage.

The present method of refining and storing crude oil and other petroleum products involves storage in vertical cylindrical steel tanks with conical or domed roofs. These roofs close the tops of the tanks tightly except for vents which extend through the roofs and are equipped with "goosenecks" to secure reasonable isolation of the space above the liquid in the tank from the outside air.

Evaporative losses from tanks of this description are larger than would be supposed from a casual consideration of the subject. The tanks are bare and their side walls become heated by the sun through the day. The resulting convection currents in the oil carry this heat throughout the tank. Furthermore these currents carry all parts of the liquid to the surface, and the joint effect of the heat and circulation is accelerated evaporation and selective evaporation of the more volatile constituents. Furthermore the wide range between night and day temperatures causes alternating expansions and contractions of the air and vapors above the liquid in the tank, with alternating outflow of vapor-saturated air and inflow of unsaturated air. This "breathing" of the tank causes heavy losses because it involves in effect a circulation of vapor-absorbing air through the space above the oil.

The present invention offers means to prevent, or at least minimize, these losses by providing a commercially practical heat insulation for the roof and side walls of such tanks. To meet the requirements of the industry, such insulation must be adaptable to existing tanks and types of tank without material structural changes in the tank, and obviously it must be composed of relatively inexpensive commercial materials and be suited to exposure to the weather.

Preferred embodiments of the invention are illustrated in the accompanying drawings, in which:—

Fig. 1 is a perspective view of a portion of the side walls and roof of a tank insulated according to this invention, but with various layers of insulation partly broken away to show how the material is supported and arranged.

Fig. 2 is a fragmentary section at the apex of the roof showing the mode of connecting the stay wires over the first layer of insulation in the structure of Fig. 1.

Fig. 3 is a view similar to Fig. 2 showing how angle irons or angle iron clips may be substituted for the stay wires.

Fig. 4 is a vertical section through a portion of the side wall and roof of the tank shown in Fig. 1.

Fig. 5 is a view similar to Fig. 1 showing a modified construction in which angle irons are substituted for the circumferential cables.

Referring first to Figs. 1 and 4, the side wall of the tank is indicated at 11, the bottom at 12 and the conical roof at 13. An angle iron 14 surrounds the upper margin of the side walls 11 and serves as a means to connect the roof and side walls which are riveted to it as indicated at 15 and 16 respectively. No attempt has been made to illustrate any of the internal supporting framework such as columns, rafters, roof purlins and the like, as such features are familiar and the present invention is not concerned with them.

A series of galvanized stranded cables 17 are drawn taut around the tank in such positions that they are supported by the overlapping edge of the plates at the joints, or by the projecting rivet heads, the former being preferred where available. The final tightening is done by means of turn-buckles 18. The cables 17 are further supported by heavy vertical galvanized suspender wires 19 spaced about five feet on centers and supported at their upper ends by the cable 17 under angle iron 14. This top cable 17 is supported by the wire 28, Figs. 1 and 4, stretched radially from cable loop 27 in Fig. 2 or a convenient mode of connecting the wires is to remove certain of the rivets 15 and loop the wire through the rivet hole as is indicated at 5 in Fig. 1.

The vertical wires 19 and the cables 17 may be connected in any desired way, but I prefer and illustrate the use of ties 21 made of galvanized annealed wire. These ties 21 are looped over and under so as to lock the cable in a bight of the suspender wire, and are then twisted sufficiently to retain the connection. Their ends are thereafter bent so as to project radially outward from the tank wall to pierce the first layer of insulation.

This insulation layer is indicated at 22 and may advisably consist of hair felt, or better a well known commercial type consisting of hair felt with a layer of waterproof paper on one or both sides. This layer of insulation, whatever its specific form, is "mopped on" with hot roofing asphalt 10 so that the asphalt forms an adhesive bond between the tank wall and the layer of insulating felt. As the felt is put in place, the tie wires 21 are pushed through it and are later used to bind light circumferential cables 23 drawn taut around the felt. The cables 23 are supported by a second set of suspender wires 24 similar to the wires 19, and supported by top cable 17. The joints between the cables 23 and suspender wires 24 are made by ties 25 similar to the ties 21, but preferably distinct therefrom and staggered relatively thereto, so as to lengthen the path for heat through these metal connections.

A second layer of insulating felt 26 is then applied and is caused to adhere to the first by the use of hot roofing asphalt. The tie wires 25 pass through this layer and are used to support metal lath or furring, as will be later described. A second set of light circumferential cables 8 is then applied.

Two layers of felt are ordinarily sufficient. Additional layers may be applied in the same way if necessary.

The first layer of insulating felt 31 is mopped to the roof 13 with hot asphalt 10 and extended over the eaves and down into contact with the similar felt on the side walls. The downward projecting layers are skived or beveled as clearly shown in the drawings, and the first layer 31 lashed by circumferential stranded cables 33.

After this first layer 31 has been mopped on, a ring or loop of heavy galvanized cable 27, Fig. 2, is placed over this insulation at top point of roof. This loop offers support to a series of wires 28 extending in a generally radial direction to the eaves of the roof and there connecting to the topmost cable 17 as a means of support for that cable and also to hold down the first layer of insulating felt 31.

These wires 28 also offer connection to tie wires 29 which hold down the second layer of insulating felt on roof and the furring. In many cases it may be preferable to substitute radially extending angle irons 30, Fig. 3, riveted to the roof deck or angle iron clips 30, Fig. 3, welded on to roof deck. Tie wires 29, Fig. 3, are attached to the angles or angle clips.

A second layer of insulating felt 32, Figs. 1 and 4, is mopped over the first felt 31 with hot asphalt 10. Tie wires 29 are brought through this felt and it is extended over eaves as before and lashed with cables 34. Between radial cables 28 and 20, Fig. 1, light cables 6 and 7 are laced both to hold down layers of insulating felt and to support additional tie wires 29.

On the last layer of insulating felt 26 on side walls and 32 on roof, wherever the edges are butted together, a 6" wide strip of asbestos felt or other suitable light felt 9 is mopped over the joint to secure a perfect seal. Likewise where tie wires 25 or 29 come through the second layer of insulating felt the opening is closed up with hot asphalt.

The entire surface is then covered with metal lath or furring 35 applied in strips which extend radially from the apex of the roof, over the eaves and vertically down the sides. For this purpose, I prefer a metal lath of the expanded metal type having integral channel-shaped stiffening ribs of unslitted metal. The commercial material known as hy-rib is typical, but the exact form of the furring is not a feature of the invention. This furring is fastened in place by means of the tire wires 25 and 29, as shown in Figs. 1 and 4.

Over the metal lath or furring 35 are troweled two coats of asbestos cement, indicated at 36 and 37, the outer one of these two coats at least being composed of waterproof material.

Over the roof portion and around the eaves, a multiple-ply asbestos roofing 38 is applied. This is caused to adhere by mopping it on with hot roofing asphalt, and it is retained in position by a layer of galvanized iron mesh wire 39 which overlies the entire roof of the tank, and which is connected at its lower edge to a circumferential cable 40 extending around the tank and its insulation a short distance below the eaves.

The whole is then given a final weatherproof coating 41 which may consist of hot roofing asphalt mopped on, or may be composed of any other desirable weather-resisting material.

In order to prevent the absorption of moisture by the heat insulating layers on the tank, the insulating material terminates above the ground level, as indicated at 42, Fig. 4, and is protected by a flashing strip 43 of asphalt saturated fabric, asbestos felts or other waterproofing felts which are mopped to the walls of the tank with hot asphalt for a substantial distance above the ground, across the bottom of the two layers of insulating felts and up the outside of last layer of insulating felt for as great a distance as it was mopped on side walls of tank. Either a concrete curb 44, Fig. 4, is installed around the bottom of tank or the space between bottom of insulation and the ground is filled with fine gravel to insure a good drainage.

In Fig. 5 is shown an alternative construction in which I dispense with the circumferential cables 17 and substitute therefor circumferential angle irons 45 welded in place. These project through the first layer of insulating felt 22 and hence support this layer which, as in the construction first described, is retained by circumferential cables 23 having suspender wires 24 and secondary tie wires 25.

The second layer of insulating material 26 is held by secondary circumferential cables 46 which are supported in part at least by the projecting ends of the tie wires 25. The angle iron 45 carries a set of tie wires 47 which pass through the second layer of insulation and hold the metal furring strips 35 as heretofore described. This furring strip supports two successive layers of asbestos cement 48 and 49, just as in the structure previously described.

As illustrating an alternative final finish, I show in Fig. 5 the application over the second coat 49 of asbestos cement of a coat 50 of concrete primer followed by a coat 51 of fibrous enamel. The exact nature of these final coats is not material as it is possible to use any coating material which is weatherproof, and which has a good bonding effect on the surface so as to reduce any tendency to chip or crack.

The various forms of the invention above described have many features in common. They involve the use of thick sheet insulating material near the wall of the tank with a coating or shell of asbestos heat insulating cement. Any such insulating shell requires support and the method described, in which the layers are supported by tie members connected to the tank or to elements supported by the tank, provides a simple construction which may be used on existing tanks, or on existing types of tank, without requiring any radical structural modifications.

This is a very important consideration because of the large amount of capital already invested in existing plants, and because of the unwillingness of the tank users to depart materially from past standard practice.

Not only does the insulating coat project the contents of the tank from marked changes of temperatures, but it also seals the entire tank (except for such breather pipes as are considered desirable). This sealing is particularly effective at the eaves where the existing type of tank is commonly quite leaky, it having been supposed that there was no particular necessity of securing a tight joint at this point.

Various modifications of structure are possible within the scope of the invention, and no necessary limitation to the particular details described is implied.

What is claimed is:—

1. The combination with an oil tank of a plurality of tie wires supported by the walls of said tank and extending outward therefrom; sheet insulation arranged in one or more layers pierced by said tie wires and surrounding said tank; metal lath overlying said sheet insulation and held in place by said tie wires; and hardened plastic heat insulating material overlying and supported by said lath.

2. The combination with an oil tank including side walls and a roof of a plurality of tie wires supported by said walls and roof and extending outward therefrom; sheet insulation pierced by said tie wires and arranged in one or more layers, on said side walls and roof, that sheet insulation on the roof being folded around the eaves to overlap the upper portion of that on the side walls; metal lath, said lath overlying said sheet insulation and being fixed in place by said tie wires; and hardened plastic heat insulating material overlying and supported by said lath.

3. The combination with an oil tank including side walls and a roof of a plurality of tie wires supported by said walls and roof and extending outward therefrom; sheet insulation pierced by said tie wires and arranged in one or more layers, on said side walls and roof, that sheet insulation on the roof being folded around the eaves to overlap the upper portion of that on the side walls; metal lath arranged in strips extending radially from the center of the roof to the eaves and then down the side walls, said lath overlying said sheet insulation and being fixed in place by said tie wires; and hardened plastic heat insulating material overlying and supported by said lath.

4. The combination with an oil tank including side walls and a roof of a plurality of tie wires supported by said walls and roof and extending outward therefrom; sheet insulation pierced by said tie wires and arranged in one or more layers, on said side walls and roof, that sheet insulation on the roof being folded around the eaves to overlap the upper portion of that on the side walls; metal lath, said lath overlying said sheet insulation and being fixed in place by said tie wires; hardened plastic heat insulating material overlying and supported by said lath; and a water-proof roofing of sheet material overlying the roof and eaves portion of said hardened plastic heat insulating material.

5. The combination with an oil tank of a plurality of cables stretched taut around said tank and supported by engagement with surface irregularities of the tank; a plurality of tie wires connected with said cables and extending outward from the surface of the tank; sheet insulation arranged in one or more layers and pierced by said tie wires; metal lath overlying said sheet insulation and fixed in place by said tie wires; and a hardened plastic heat insulating covering overlying and supported by said lath.

6. The combination with an oil tank of a plurality of cables stretched taut around said tank and supported by engagement with surface irregularities of the tank; a plurality of tie wires connected with said cables and extending outward from the surface of the tank; sheet insulation pierced by said tie wires and surrounding said tank; circumferential cables surrounding said insulation and connected with said tie wires; a second set of tie wires carried by said circumferential cables; a second layer of sheet insulation overlying the first and pierced by the second set of tie wires; metal lath overlying the second layer of insulation and retained by the second set of tie wires; and plastic heat insulating material overlying and supported by said lath.

7. The combination of a roofed cylindrical oil tank; a plurality of cables stretched taut around the side walls of said tank and supported by engagement therewith; a plurality of tie wires connected with said cables and extending outward from the surface of said tank; a plurality of tie wires supported by the roof and extending upward therefrom; a plurality of layers of sheet insulating material covering said side walls and roof and pierced by tie wires, those on the roof extending downward around the eaves and overlapping the upper portion of those on the side walls; circumferential binding cables certain of which surround layers of side wall insulation and are connected with adjacent tie wires, and certain others of which surround and bind the down-turned margins of the roof insulation; secondary tie wires supported by said cables; lath overlying said roof and side wall insulation and retained by said roof tie wires and said secondary tie wires; and a coating of hardened plastic heat insulating material covering and supported by said lath.

8. The combination of a roofed cylindrical oil tank; a plurality of cables stretched taut around the side walls of said tank and supported by engagement therewith; a plurality of tie wires connected with said cables and extending outward from the surface of said tank; a plurality of tie wires supported by the roof and extending upward therefrom; a plurality of layers of sheet insulating material covering said side walls and roof and pierced by tie wires, those on the roof extending downward around the eaves and overlapping the upper portion of those on the side walls; circumferential binding cables certain of which surround layers of side wall insulation and are connected with adjacent tie wires, and certain others of which surround and bind the down-turned margins of the roof insulation; secondary tie wires supported by said cables; lath overlying said roof and side wall insulation and retained by said roof tie wires and said secondary tie wires; a coating of hardened plastic heat insulating material covering and supported by said lath; and a multiple-ply sheet roofing applied over the roof portion of said hardened plastic material.

9. The combination of a roofed cylindrical oil tank; a plurality of cables stretched taut around the side walls of said tank and supported by engagement therewith; a plurality of tie wires connected with said cables and extending outward from the surface of said tank; a plurality of tie wires supported by the roof and extending upward therefrom; a plurality of layers of sheet insulating material covering said side walls and roof and pierced by tie wires, those on the roof extending downward around the eaves and overlapping the upper portion of those on the side walls; circumferential binding cables certain of which surround layers of side wall insulation and are connected with adjacent tie wires, and certain others of which surround and bind the down-turned margins of the roof insulation; secondary tie wires supported by said cables; lath overlying said roof and said side wall insulation and retained by said roof tie wires and said secondary tie wires; a coating of hardened plastic heat insulating material covering and supported by said lath; a multiple-ply sheet roofing applied over the roof portion of said hardened plastic material; a wire mesh fabric stretched over said roofing to retain and protect the same; and a binding cable connected to the margin of said fabric and drawn taut about the insulating layers on the side walls of said tank.

In testimony whereof I have signed my name to this specification.

LESLIE A. BALDWIN.